United States Patent
Elnathan et al.

(10) Patent No.: US 7,245,616 B1
(45) Date of Patent: Jul. 17, 2007

(54) DYNAMIC ALLOCATION OF PACKETS TO TASKS

(75) Inventors: Nathan Elnathan, Ranana (IL); Alexander Joffe, Palo Alto, CA (US); Ilan Pardo, Ramat Hasharon (IL)

(73) Assignee: Applied Micro Circuits Corporation, San Diego, CA (US)

( * ) Notice: Subject to any disclaimer, the term of this patent is extended or adjusted under 35 U.S.C. 154(b) by 897 days.

(21) Appl. No.: 10/103,436

(22) Filed: Mar. 20, 2002

(51) Int. Cl.
*H04L 12/28* (2006.01)
*H04L 12/56* (2006.01)

(52) U.S. Cl. ............. 370/389; 370/392; 370/412

(58) Field of Classification Search .......... 370/389, 370/392, 412
See application file for complete search history.

(56) References Cited

U.S. PATENT DOCUMENTS

| | | | |
|---|---|---|---|
| 5,418,953 A * | 5/1995 | Hunt et al. ............ | 718/102 |
| 6,246,684 B1 * | 6/2001 | Chapman et al. ....... | 370/394 |
| 6,389,016 B1 | 5/2002 | Sabaa et al. | |
| 6,731,652 B2 * | 5/2004 | Ramfelt et al. ........ | 370/489 |
| 6,778,548 B1 | 8/2004 | Burton et al. | |
| 6,853,641 B2 | 2/2005 | Lindhorst-Ko et al. | |
| 6,862,282 B1 | 3/2005 | Oden | |
| 6,947,425 B1 | 9/2005 | Hooper et al. | |
| 2003/0012200 A1 | 1/2003 | Salamat | |

OTHER PUBLICATIONS

U.S. Appl. No. 10/103,393, filed Mar. 20, 2002, entitled "Reordering of Out-Of-Order Packets," inventor: Nathan Elnathan, pp. 1-21 and 10 Sheets of drawings.

* cited by examiner

*Primary Examiner*—Kevin C. Harper
(74) *Attorney, Agent, or Firm*—Michael Shenker; MacPherson Kwok Chen & Heid LLP

(57) ABSTRACT

Tasks are dynamically allocated to process packets. In particular, packets of data to be processed are assigned a packet identification. The packet identification includes a lane and a packet sequence number. The term "lane" as used herein refers to a port number and a direction (i.e. ingress or egress), such as Port 3 Egress. A set of resources (e.g., registers and memory buffers) are associated with each lane. The task is allowed to access resources associated with the lane. In some embodiments, a task may change the port that it services and use the resources associated with that port.

35 Claims, 7 Drawing Sheets

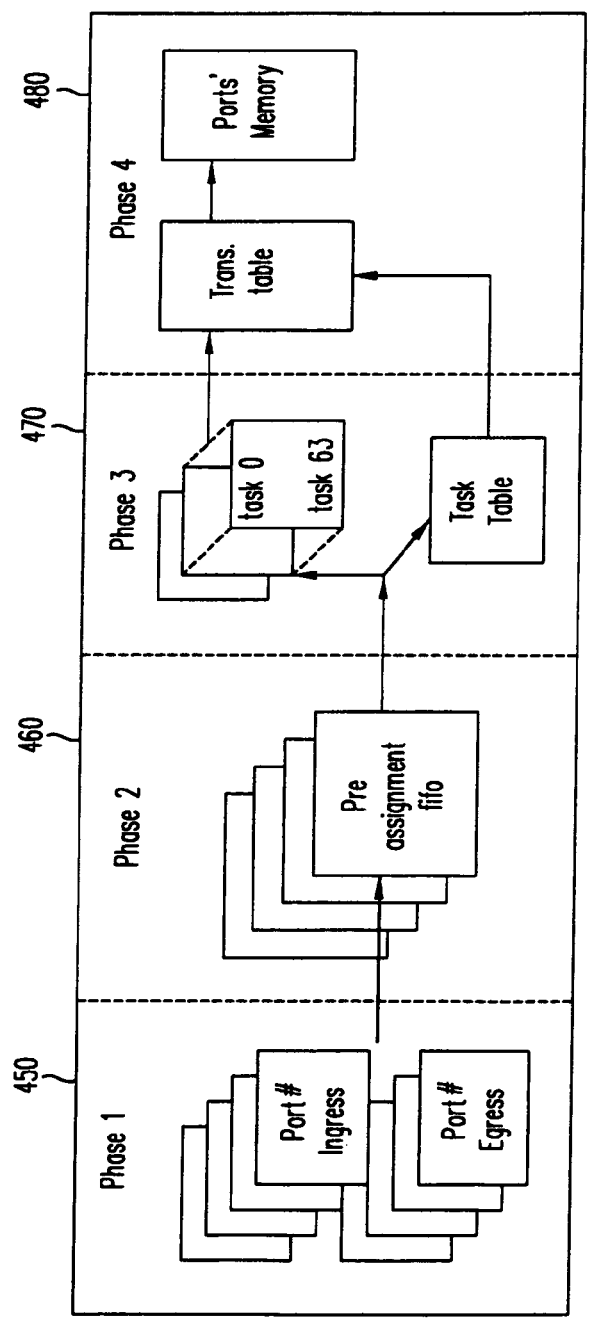
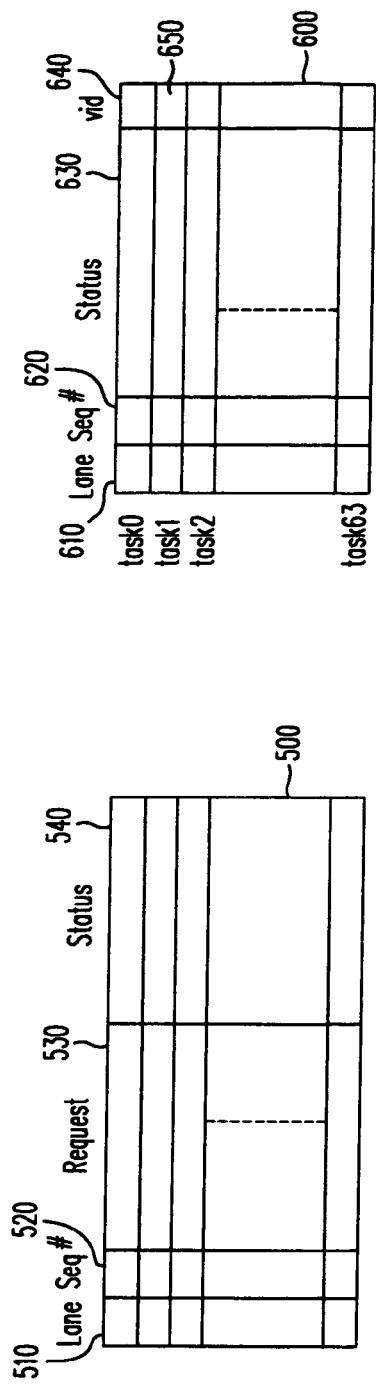
FIG. 4B
FIG. 5
FIG. 6

DYNAMIC ALLOCATION OF PACKETS TO TASKS

CROSS REFERENCE TO RELATED APPLICATIONS

This document is related to and incorporates by reference herein in its entirety the following U.S. patent application:

Application Ser. No. 10/103,393, entitled "Reordering of Out-of-Order Packets," by Nathan Elnathan, filed Mar. 20, 2002.

CROSS REFERENCE TO ATTACHED APPENDIX

Appendix A contains the following files in one CD-ROM (of which two identical copies are attached hereto), and is a part of the present disclosure and is incorporated by reference herein in its entirety:

```
Volume in drive D is 020320_1121
Volume Serial Number is B8AA-6919
Directory of D: \
03/20/02    11:21a    <DIR>      .
03/20/02    11:21a    <DIR>      ..
03/20/02    11:20a              58,707 ch_bank__12fe.v
03/20/02    11:20a              55,668 ch_bank__1ge.v
03/20/02    11:20a              23,223 ch_cmd.v
03/20/02    11:20a              48,120 imau_ab_calc.v
03/20/02    11:20a               7,758 1su_cfifo.v
03/20/02    11:20a             295,309 out_control.v
              8 File(s)        488,785 bytes
       Total Files Listed:
              8 File(s)        488,785 bytes
                                     0 bytes free
```

The files of Appendix A form source code of computer programs and related data of an illustrative embodiment of the present invention.

A ch_cmd.v file describes a translation table update upon request, which holds per task a lane and packet sequence number and the checking of a buffer's current sequence number against the task's packet sequence number and which sends the task to suspend if the numbers do not match.

A lsu_cfifo.v file describes a request FIFO issuing a lane, packet sequence number which goes to the translation table A ch_bank__1ge.v file and a ch_bank__12fe.v file describe the structure of the channel command buffers and instantiation of the Out Control, which issues the channel commands in order.

An out_control.v file does the issuing of channel commands in order.

An imau_ab_calc.v file describes the mechanism of updating the ch_cmd by the new current sequence number, upon close.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A micro controller is a processor on a microchip that performs, for example, arithmetic and logic operations. A micro controller creates a task to perform a set of instructions. For example, a task may perform processing on a packet, which is a unit of data.

Packets are received and stored in memory in the order in which they were received in, for example, a First In First Out (FIFO) queue. One task is assigned to one packet and performs processing on the packet. In conventional systems, the task is hard-wired to use particular resources (e.g., FIFO queues and memory registers).

For example, during processing, a task generates commands that describe how the packet is to be transferred, for example, across a network. The task is hard-wired to write the commands into a particular FIFO queue in memory. During processing, the task may require the use of memory registers to store information. The task is hard-wired to use specific registers.

Therefore, for each task, separate resources must be available. This leads to a requirement of many separate FIFO queues, memory registers, and other resources.

SUMMARY

In accordance with some embodiments of the invention, tasks are dynamically allocated to process packets. In particular, packets of data to be processed are assigned a packet identification. The packet identification includes a lane and a packet sequence number. The term "lane" as used herein refers to a port number and a direction (i.e. ingress or egress), such as Port 3 Egress. The term "packet sequence number" refers to a number that is sequentially increasing (or decreasing in some embodiments) to indicate the order in which packets are received at a port. A set of resources (e.g., registers and memory buffers) are associated with each lane. The task is allowed to access resources associated with the lane. In some embodiments, a task may change the port that it services and use the resources associated with that port.

BRIEF DESCRIPTION OF THE DRAWINGS

FIG. 4B illustrates, in a block diagram, four phases of processing a packet in accordance with some embodiments of the invention.

FIG. 5 illustrates, in a block diagram, a pre-assignment FIFO in accordance with some embodiments of the invention.

FIG. 6 illustrates, in a block diagram, a task table in accordance with some embodiments of the invention.

Use of the same reference symbols in different figures indicates similar or identical items.

DETAILED DESCRIPTION

In accordance with some embodiments of the invention, tasks are dynamically allocated to process packets. In particular, packets of data to be processed are assigned a packet identification. The packet identification includes a lane and a packet sequence number. The term "lane" as used herein refers to a port number and a direction (i.e. ingress or egress), such as Port 3 Egress. In some embodiments, a "lane number" is used for the identification. For example, Port 3 Egress may be referred to as lane 3e. A set of resources (e.g., registers and memory buffers) are associated with each lane. The task is allowed to access resources associated with the lane.

In particular, as a task completes processing a packet, the task is assigned to process another packet. In some embodiments, the next available task is assigned to the next available packet. In some embodiments, a packet is assigned to be processed to a task based on several criteria.

When a task is assigned to a packet, the task receives the packet identification of the packet (i.e., lane and packet sequence number). A task is allowed to access the set of resources associated with the lane specified in the packet identification of the packet. Access to a resource, for example to a database, is directed to a portion of the resource based on the lane and packet sequence number. In particular, the task has access to all resources of the packet, using redirection of accesses, according to the packet identification. The access to any resource is qualified by this packet identification.

In some embodiments, a task may change the port that it services and use the resources associated with that port.

Thus, some embodiments of the invention are able to process packets in a multi-lanes and multi-tasking environment.

Figure 1:
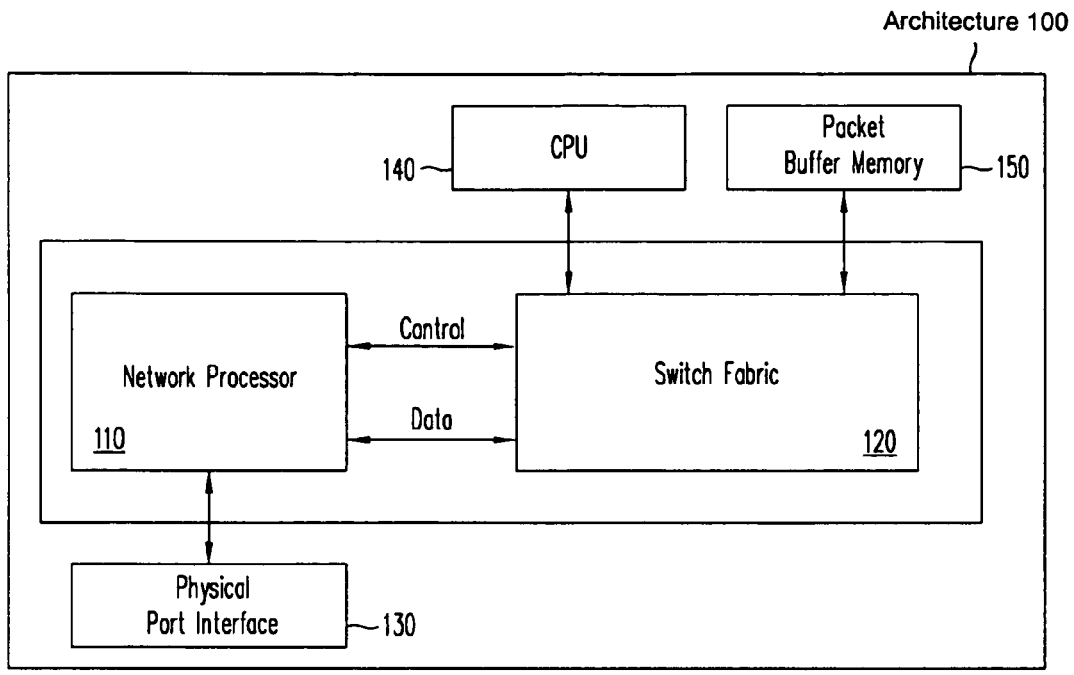
FIG. 1 illustrates, in a block diagram, an architecture 100 in accordance with some embodiments of the invention.

FIG. 1 illustrates, in a block diagram, an architecture 100 in accordance with some embodiments of the invention. The architecture 100 includes a network processor 110 connected to a switch fabric 120. The network processor 110 contains one or more micro controllers (also referred to as "nPcores") and performs various transformations on the packet data as it enters or leaves the switch fabric 120. The switch fabric 120 refers to a combination of hardware and software that moves data coming in to the network processor 110 and out by the correct port. The switch fabric 120 includes switching units, integrated circuits that they contain, and the programming that allows switching paths to be controlled. The switch fabric 120 also manages an external packet buffer memory 150, in which packet data resides while it is within the switch fabric 120.

The overall process by which packets move from the physical port interface 130 to the packet buffer memory 150 is referred to as "ingress." The overall process by which packets move from the packet buffer memory 150 to the physical port interface 130 is referred to as "egress." The physical port interface 130 includes media access controllers.

The CPU interface 140 is connected to the switch fabric 120. The CPU interface 140 supports switch management functions, such as initialization and connection set up when a computer is started. The CPU interface 140 also enables micro controller program download to the network processor 110 during a boot process (when the computer is started or rebooted). During operation of the computer, after the boot process has completed, the CPU interface 140 also allows applets to be downloaded to the network processor 110. Control commands and data packets are routed between the network processor 110 and the switch fabric 120.

Figure 2:
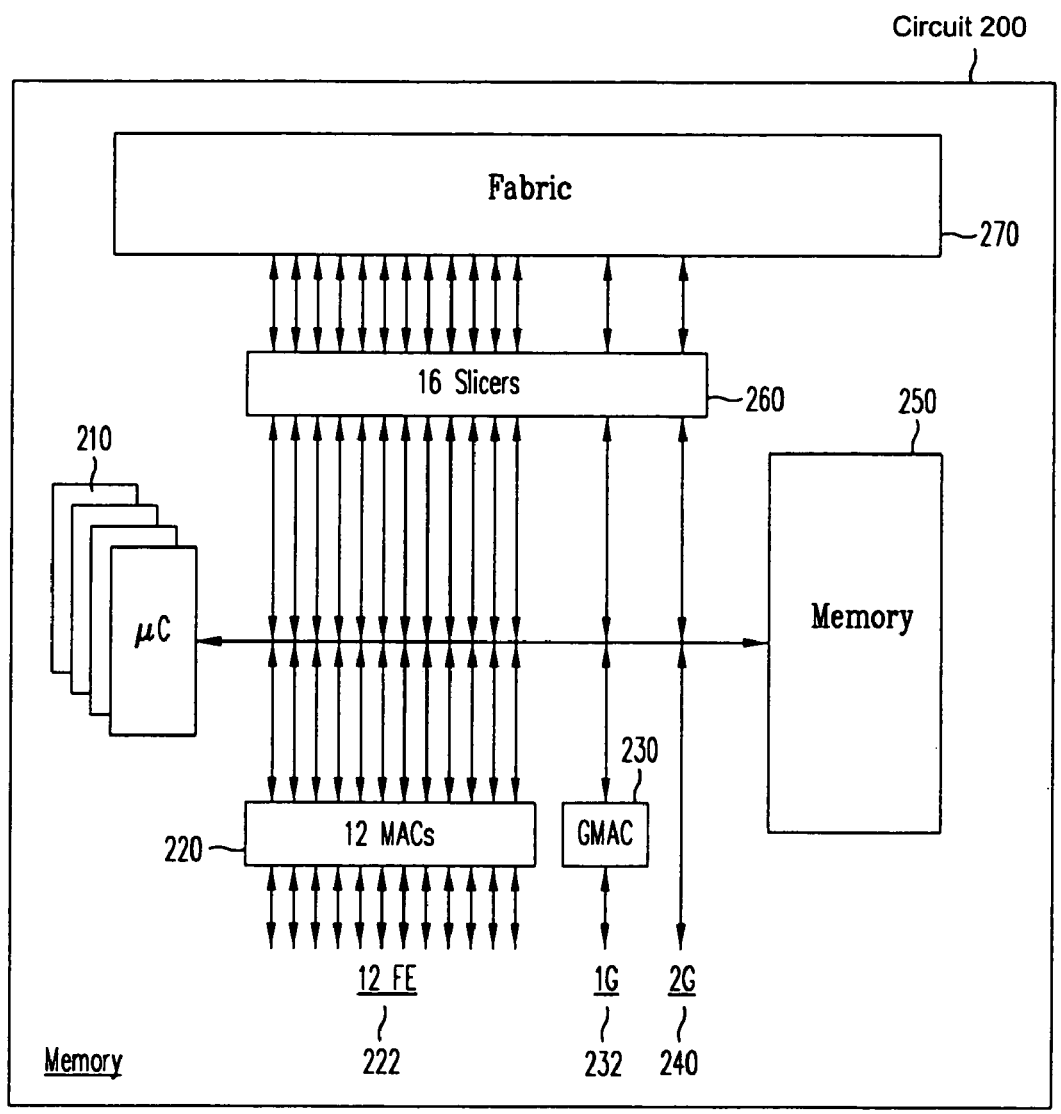
FIG. 2 illustrates, in a block diagram, an internal structure of a port interface in accordance with some embodiments of the invention.

FIG. 2 illustrates, in a block diagram, an internal structure of a port interface in accordance with some embodiments of the invention. The port interface includes micro controllers that are in the network processor 110, a switch fabric 120, and details of the physical port interface 130. A port is a location on a computer at which other devices (e.g., a printer or a facsimile machine) may be connected to the computer.

Circuit 200 of FIG. 2 includes micro controllers 210 (labeled "µC"). Each micro controller 210 is a special purpose central processing unit. The micro controllers 210 execute programs to control the operation of all of the internal blocks in circuit 200. In particular, the micro controllers 210 generate tasks to execute instructions.

The circuit 200 also includes 12 media access controllers 220 that are used to connect to 12 fast Ethernet ports 222, a gigabit media access controller 230 that is used to connect to one gigabit Ethernet port 232, and a two gigabit stack port 240. The micro controllers 210 service all ports based on assignment of micro controllers to ports. In particular, as a packet is received from a port, the packet is stored in a First In First Out (FIFO) queue. As tasks become available, they are assigned to process packets. As each task is associated with a micro controller 210, assignment of tasks to packets also assigns micro controllers 210 to those packets, and thus to the ports from which the packets arrived. The circuit 200 also includes a memory 250, which may store, for example, FIFO queues and registers.

The circuit 200 includes 16 slicers 260. The slicers 260 are used to send data to and from the fabric 270. The slicers 260 include an ingress portion and an egress portion. The ingress portion divides packets (also referred to as "frames") that are received from ports into cells, attaches an appropriate tag to each cell to identify the packet with which the cell is associated, and forwards the cells to the fabric 270. The egress portion combines cells received from the fabric 270 to form an Ethernet frame (i.e. one type of frame).

Figure 3:
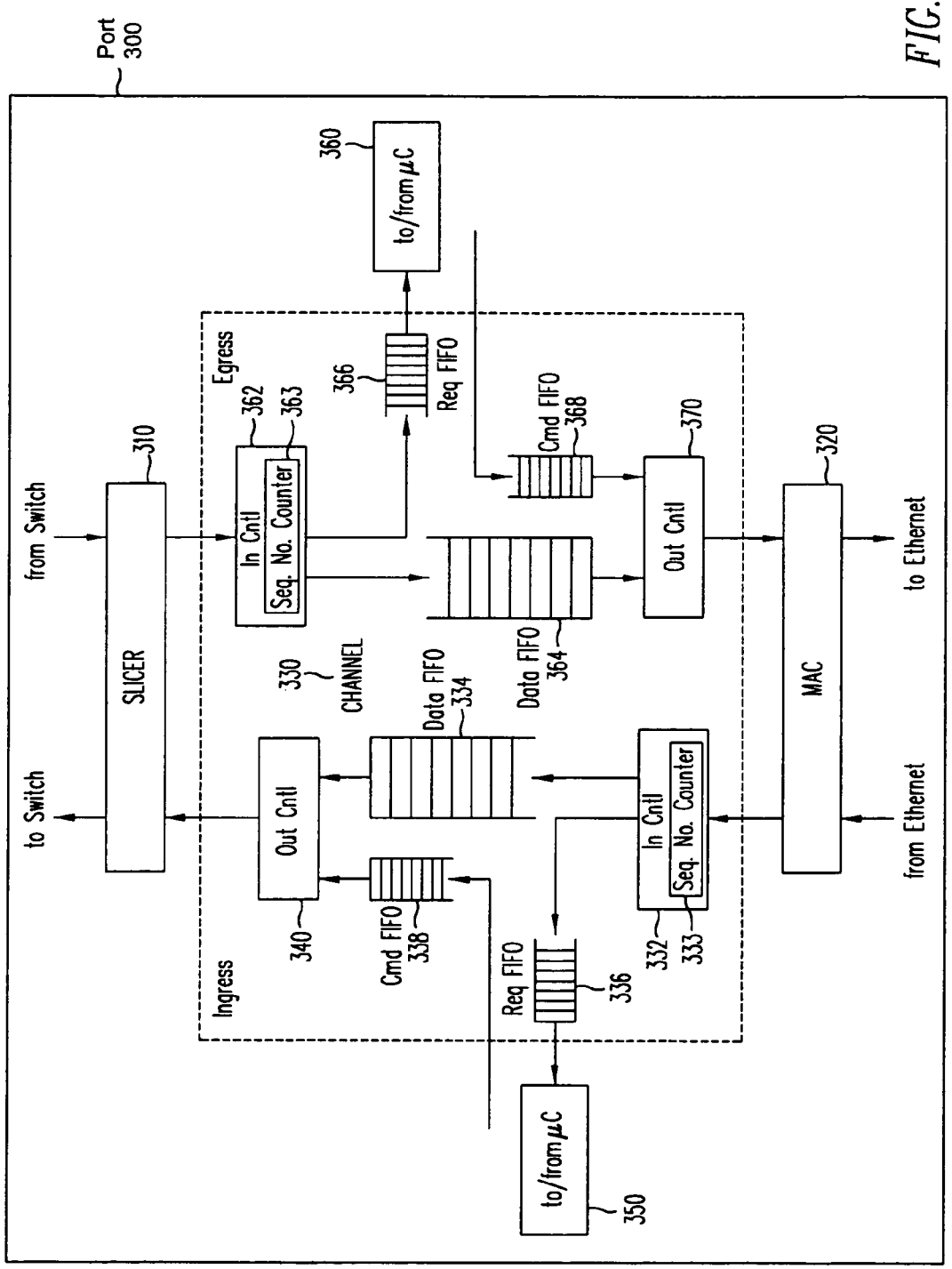
FIG. 3 illustrates, in a block diagram, a logical model of a port 300 in accordance with some embodiments of the invention.

FIG. 3 illustrates, in a block diagram, a logical model of a port 300 in accordance with some embodiments of the invention. The logical model of the port 300 includes a slicer 310, which receives packets from a switch and sends packets to a switch. A media access control (MAC) 320 serves as an interface to and from an Ethernet. A channel 330 offers a bidirectional data path from the switch fabric to the MAC. In particular, the channel 330 consists of two unidirectional data paths, one for ingress and one for egress. The term "lane" will be used herein to indicate either the ingress or egress data path of a channel.

For ingress, a packet (e.g., an Ethernet frame) arrives from the Ethernet to the MAC 320. The packet is transferred to the input control 332, which stores the packet into a data FIFO 334. The input control 332 includes a sequence number counter 333, which is used to generate a sequence number to be assigned to the packet. In some embodiments, the sequence number counter 333 is a register that holds a sequence number (initialized to zeros) which is assigned to a packet and incremented before the next packet is assigned a sequence number. The input control 332 also writes a request into a request FIFO 336 to notify a micro controller 350 to process the packet of data. The request FIFO 336 includes one entry for each packet that is received. The micro controller 350 reads the request FIFO 336 and reads the header of a packet in the data FIFO 334. The micro controller 350 and creates a task to process the packet, and the task stores commands that describe how the packet is to be transferred into a command FIFO 338. The command FIFO 338 may be divided into lanes, which are divided into one or more command buffers. The output control 340 reads and executes commands from the command FIFO 338 that were issued by tasks of the micro controller 350. Several commands may be related to the same packet. By executing these commands, the output control 340 transfers data inside the command to the slicer 310 and transfers data from the data FIFO 334 to the slicer 310. The slicer 310 forwards the packet to the switch.

The micro controller 350 interfaces with the channel 330 through the request FIFO 336 and command FIFO 338. When data is written into the request FIFO 336, the micro controller 350 is sent an indication that there is a new request pending. The command FIFO 338 is divided into several portions, allowing several tasks to write to the command FIFO 338 simultaneously. When the command FIFO 338 is fill, the channel 330 sends an indication to the micro controller 350 to prevent the micro controller 350 from writing another command. The micro controller 350 also has direct access to the data FIFO 334, where packets are stored.

For egress, a packet arrives from the switch to the slicer 310. The packet is transferred to the input control 362, which stores the packet into a data FIFO 364. The input control 362 stores the packet into a data FIFO 364. The input control 362 also includes a sequence number counter 363, which is used to assign sequence numbers to packets. The input control 362 also writes a request into a request FIFO 366 to notify a micro controller 360 to process the packet of data. The request FIFO 366 includes one entry for each packet that is received. The micro controller 360 reads the request FIFO 366 and reads the header of a packet in the data FIFO 364. The micro controller 360 and creates a task to process the packet, and the task stores commands that describe how the packet is to be transferred into a command FIFO 368. The command FIFO 368 may be divided into lanes, which are divided into command buffers. The output control 370 reads and executes commands from the command FIFO 338 that were issued by tasks of the micro controller 360. Several commands may be related to the same packet. By executing these commands, the output control 370 transfers data inside the command to the MAC 320 and transfers a packet from the data FIFO 364 to the MAC 320. The MAC 320 forwards the packet to the Ethernet.

Figure 4A:
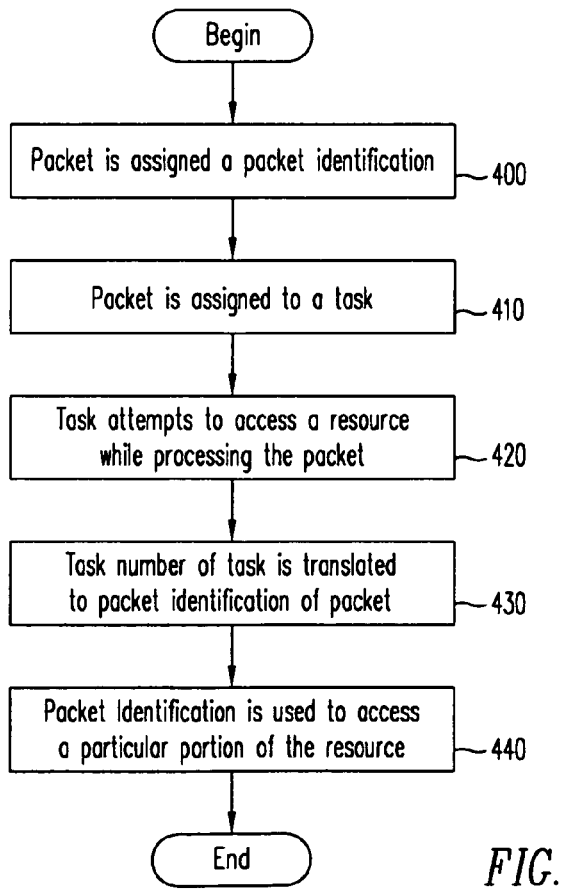
FIG. 4A illustrates, in a block diagram, acts performed by a micro controller in accordance with some embodiments of the invention to perform packet processing.

FIG. 4A illustrates, in a block diagram, acts performed by a micro controller in accordance with some embodiments of the invention to perform packet processing. Act 410 represents the input control assigning a packet identification (lane, packet sequence number) to a packet.

Figure 9:
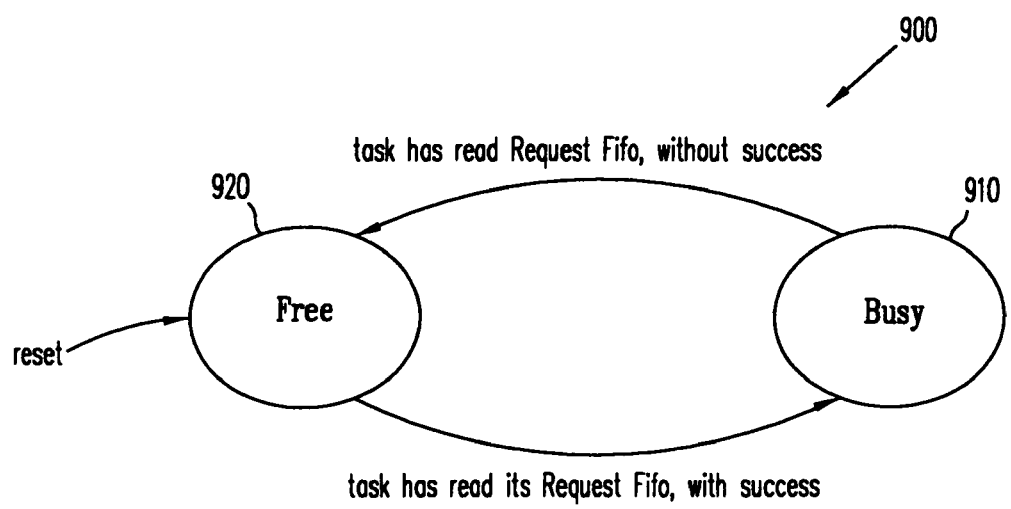
FIG. 9 illustrates a task state machine that may be used in accordance with some embodiments of the invention.

Act 420 represents a task being assigned to a packet. In some embodiments, when a task becomes available, the task is assigned to a packet. For example, to assign packets to tasks, the state machine 900 illustrated in FIG. 9 may be used in accordance with some embodiments of the invention. Each task has an associated state machine 900. The state machine 900 has two states: busy 910 and free 920. If a task is in the busy state 910, requests to process a packet (stored in a request FIFO) are not sent to this task. Also, if a task is in the busy state 910, and the task has read the request FIFO without success, the task moves to the free state 920. If a task is in the free state 920, the task is reaching the end of a packet processing (or has completed packet processing), and thus is able to process a new packet. Thus, requests may be passed to tasks that are in the free state. If a task is in the free state 920 and has read the request FIFO with success, the task moves into the busy state 910.

In some embodiments, when a task completes processing a packet, the task automatically reads the next available request in the request FIFO and processes the packet for which the request was stored.

In some embodiments, a task that is free or is about to be very soon is selected to process a packet based on multiple criteria. In particular, candidate tasks (i.e., tasks that are free or about to be very soon) are identified. Then, a task is selected from the candidate tasks to process a packet. For example, the state machine 900 of each task may be used to identify candidate tasks. In particular, the tasks in the free state are candidate tasks for packet assignments.

Additionally, each physical micro controller may have four virtual micro controllers. Each virtual micro controller may have four tasks. A task may be selected from the candidate tasks based on how few active tasks are on a virtual micro processor and how few active tasks are on a physical micro controller. The number of active tasks for the virtual micro processors and physical micro processors may be stored, for example, in registers in memory 250. For example, a task may be selected because it is running on a virtual micro controller that has fewer active tasks than other virtual micro controllers and is running on a physical micro controller that has fewer active tasks than other physical micro controllers.

To select a task from the candidate tasks, initially, each candidate task is given a grade between 0 to N (where N represents the total number of active tasks that may be active on the virtual micro controller). One or more tasks with the lowest grades are selected at this time, and these are referred to as "winner candidate tasks".

Next, from the winner candidate tasks, a task is selected to process a packet. In particular, each winner candidate task is given a second grade (between 0 and M, where M represents the total number of tasks that may be active on a physical micro controller), which reflects how many tasks are active in its physical micro controller. Based on the second grade, a task is selected from the winner candidate tasks. The selected task has the lowest grade of the winner candidate tasks. If multiple winner tasks have the same second grades, any one of them may be selected.

Act 420 represents a task that is assigned to process a packet attempting to access a resource while processing the packet. Act 430 represents the task number of the task being translated to a packet identification (e.g., lane, sequence number) of the packet.

Figures 7A, 7B:
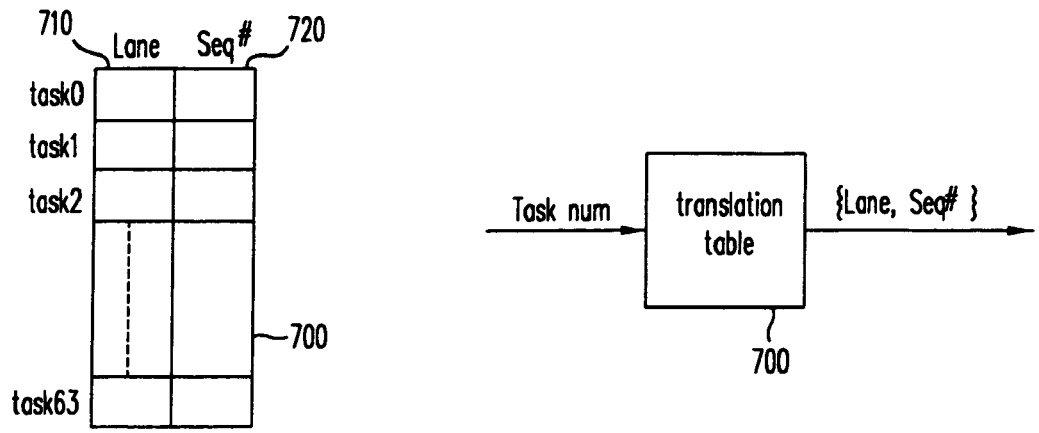
FIGS. 7A and 7B illustrate, in block diagrams, a translation table and its use in accordance with some embodiments of the invention.

FIGS. 7A and 7B illustrate, in block diagrams, a translation table 700 and its use in accordance with some embodiments of the invention. In FIG. 7A, the translation table 700 has an entry for each task and stores the lane 710 and packet sequence number 720 for the task. Once the task is assigned to a packet, the translation table 700 is updated.

The translation table is used to translate load-store addresses. When the task attempts to access a resource (e.g., a command FIFO), the address within the resource is determined with the task number of the task that has generated the access. As is illustrated in FIG. 7B, when a task number is available, the translation table 700 may be used to obtain the lane 710 and packet sequence number 720. Thus, the task number and translation table are used to obtain the lane and which packet sequence number are related to the access. Since particular resources are associated with particular lanes, the task will only be allowed to access the resources associated with its lane. In this way, it is possible to translate accesses from different virtual micro controllers to the same port memory section.

Figure 8:
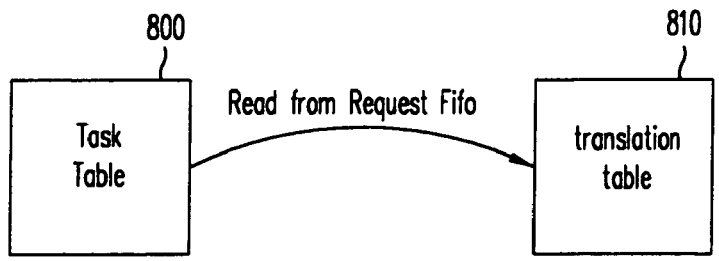
FIG. 8 illustrates, in a block diagram, processing of a read from a request FIFO.

The read request is used for synchronization. After reading the request, the virtual micro controller belongs to the lane and packet sequence number that it is serving. FIG. 8 illustrates, in a block diagram, processing of a read from a request FIFO. When a request in a task table is processed 800, the translation table 810 is used to access the resources allocated to the task.

Act 440 represents the packet identification being used to access a particular portion of the resource. For example, a command FIFO may be partitioned into lanes, with each lane being partitioned into command buffers. Then, the lane in the packet identification is used to identify the lane that the task may access. Additionally, the sequence number may be used to identify a portion of the lane (i.e., a command buffer within the lane) that the task may access.

FIG. 4B illustrates, in a block diagram, four phases of processing a packet in accordance with some embodiments of the invention. In Phase-1 450 a packet coming from the fabric and through slicer 310 is sampled and transferred to data FIFO 364 and a packet coming from the MAC 320 is sampled and transferred to data FIFO 334. The term "input packet" will be used herein to refer to packets coming from the MAC 320 along the ingress lane and inputs coming from the switch 310 on the egress lane. Each input packet is assigned to a micro controller task.

In Phase-2 460, four different pre-assignment FIFOs are used, which may be stored in memory 250. In some embodiments, the pre-assignment FIFOs include an ingress FIFO and an egress FIFO.

In other embodiments the pre-assignment FIFOs may include an ingress FIFO having high priority, an ingress FIFO having low-priority, an egress FIFO having high priority, and an egress FIFO having low priority. For each of the four FIFOs, a user may define a maximum number of tasks as resources. This allows the user to guarantee a number of tasks assigned to the ingress lane and the egress lane.

Any new packet coming from the MAC or slicer is assigned a new entry in a pre-assignment FIFO. FIG. 5 illustrates, in a block diagram, a pre-assignment FIFO 500 in accordance with some embodiments of the invention. Each pre-assignment FIFO includes, for each entry (i.e., each request stored in the pre-assignment FIFO), a lane 510, a packet sequence number 520, a request 530, and a status 540. In particular, each new packet coming from one of the ports has an associated lane and is assigned a packet sequence number. The combination of the lane and the packet sequence number uniquely identifies the packet.

Each new packet is written to a data FIFO. A write pointer that indicates the location of the start of the packet in the data FIFO is transferred to the micro controller via the request FIFO.

In some embodiments, if a task has already been assigned to process a packet, a task number of the task is also written into the packet's request in the request FIFO. The task number may be used to update the status of the packet in the pre-assignment FIFO.

In Phase-3 470, the pending entries from the pre-assignment FIFOs are written to a request FIFO, and packets are assigned to tasks for processing. Each of the pre-assignment FIFOs is served using a weighted round robin system, according to user programmable weights. A round robin system refers to a technique of equally serving each of the four FIFOs in some order. In this case, the order is based on user programmable weights. In other embodiments, other techniques may be used to select the order in which the pre-assignment FIFOs are to be served.

In some embodiments, each entry (i.e., a packet request) in a pre-request FIFO is written into a request FIFO. Then, the assigned task accesses the written request in the request FIFO. When the task is assigned to a request in the request FIFO, the task is assigned to process the packet for which the request was generated. The task may be assigned to process a request in various ways, such as those discussed above with reference to act 410.

In some embodiments, a task is assigned to a request in a pre-request FIFO. Then, the request to process the packet is written from the pre-request FIFO to the request FIFO of the micro controller which hosts the packet (i.e., the micro controller whose task will process the packet). That is, the request is written to the part of the request FIFO that is used to serve the selected task.

In some embodiments, when a task is assigned to a request in the pre-assignment FIFO, the task may be assigned to process a request in various ways, such as those discussed above with reference to act 410. For example, candidate tasks maybe identified, and a task may be selected from the candidate tasks based on how few active tasks are on a virtual micro processor and how few active tasks are on a physical micro controller. For example, a task may be selected because it is running on a virtual micro controller that has fewer active tasks than other virtual micro controllers and is running on a physical micro controller that has fewer active tasks than other physical micro controllers.

To allow the task selected to process the next request to access the request FIFO, the Request State in the task control of the selected micro controller is locked on the selected task. Any access, performed by a non-selected task, will not be allowed until the request FIFO is read by the selected task. This ensures that the task that is assigned to a packet actually processes that packet.

FIG. 6 illustrates, in a block diagram, a task table 600 in accordance with some embodiments of the invention. The task table 600 includes one entry per task. For example, task1 has entry 650. Each entry includes the following fields: a lane 610, a packet sequence number 620, a status 630, and a valid indicator 640. In some embodiments, the status is passed to the task table 600.

In Phase-480, the request FIFO of the selected micro controller may be full. If so, the task assigned to the next packet in the request FIFO forces the associated micro controller to allow reading only by that task. Once the request is read, the task is assigned to the packet and is aware of the packet's attributes: the lane, the packet sequence number, and the status.

In some embodiments, although each task is assigned to a specific port, the task may switch to serve another port and accesses the resources of the other port. For example, a task may be processing a packet from Port 3 Ingress, and the task may switch to Port3 Egress to send a packet that represents a return message. When the task switches to Port3 Egress, the task accesses the resources of Port3Egress.

In some embodiments, a task might change its identity, by writing to a translation table with a new identity. That is, the task updates the translation table to change the lane. A task with the new identity is able to access all of the new port's resources (e.g., registers and FIFOs, except the command FIFO). The task with the new identify is not able to access the command FIFO as this may lead to two tasks (the task with the new identity and the task assigned to a packet) attempting to process the same packet in the command FIFO.

In some embodiments, the translation table is updated only on a read request FIFO command when a task reads a request, thus avoiding synchronization problems. The task controls the update of the translation table. If the task does not read from the request FIFO, no contentions occur.

Figure 10:
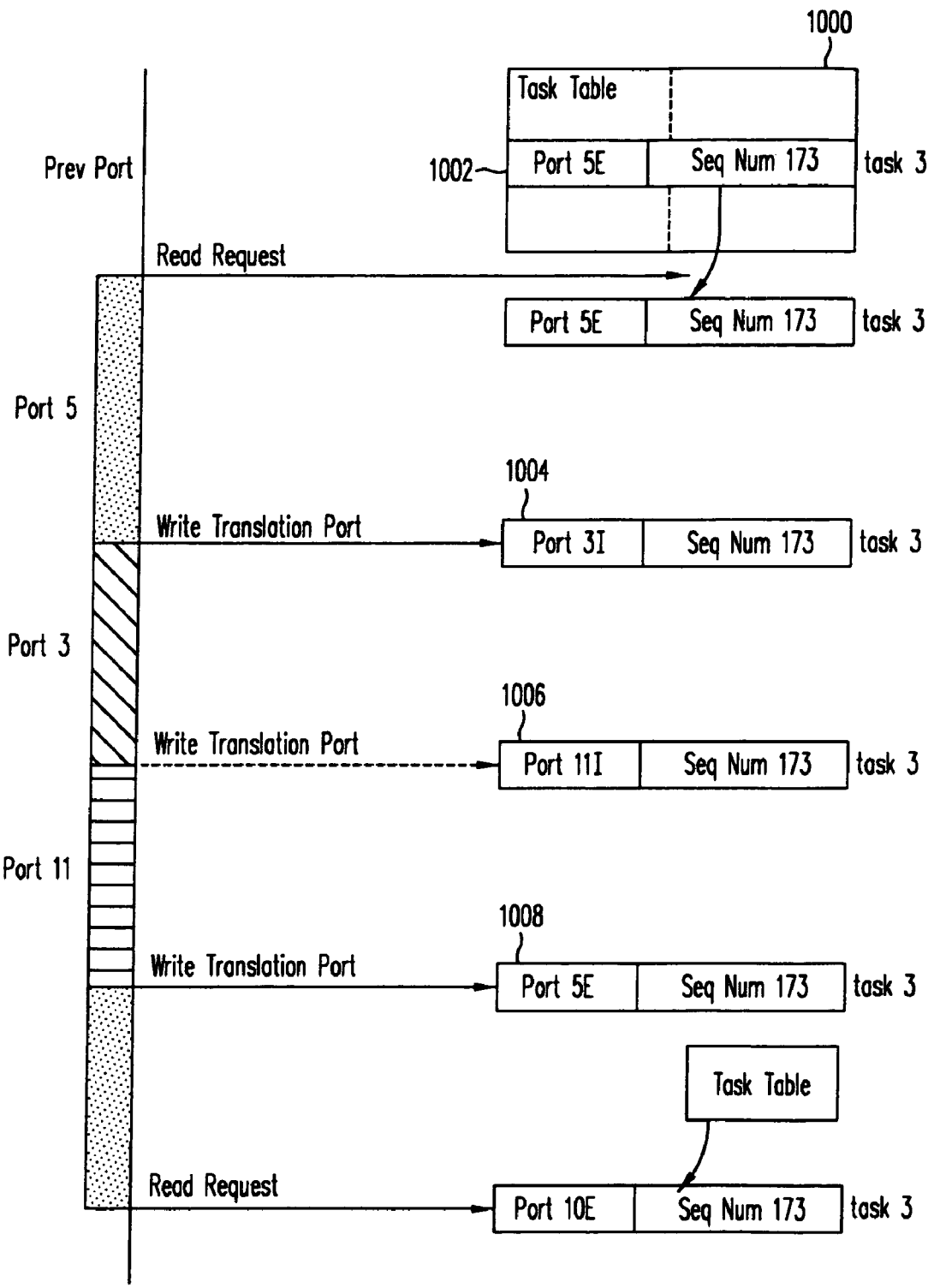
FIG. 10 illustrates, in a block diagram, a sequence of events for a task that changes its identity in accordance with some embodiments of the invention.

FIG. 10 illustrates, in a block diagram, a sequence of events for a task that changes its identity in accordance with some embodiments of the invention. In this illustration, a command FIFO belongs to Port 3 through the sequence of events for sequence number 173 (labeled "Seq Num 173"). For example, the lane is initially Port 5 Egress 1002. Then, the task performs a read request. The task performs a write to the translation table 1000 to change the lane to Port 3 Ingress 1004. The task later writes to the translation table 1000 to change the lane to Port 11 Ingress 1006. The task again writes to the translation table to change the lane to Port 5 Egress 1008.

The task writes a close command into a command buffer to release the command buffer.

The interface to the translation table is through the Translation Port Num Register and Translation Sequence Num Register. These registers may be stored in memory 250. Any write to the Translation Port Num Register changes the lane. Any write to the Translation Sequence Num Register changes the packet sequence number.

In order to insert a new packet (i.e., one that has not arrived through the MACs or slicers), the task obtains a packet sequence number from the port's in control sequence number counter by reading the Translation Sequence Num Register. Any read from the Translation Sequence Num Register returns a packet sequence number and automatically increments the sequence number counter by one (as if the in control had processed a newly arrived packet to which the packet sequence number was allocated). If at the same clock, there is both a read from Translation Sequence Num Register, and a packet sequence number allocation request from a MAC or slicer, the response to the request from the MAC or slicer is postponed a clock.

If the task reads the Translation Sequence Num Register, the task is committed to write at least open-close commands to the command FIFO for the packet sequence number, otherwise the out control will be in wait mode, waiting for the task that is to process the packet sequence number to write its commands.

Figure 11:
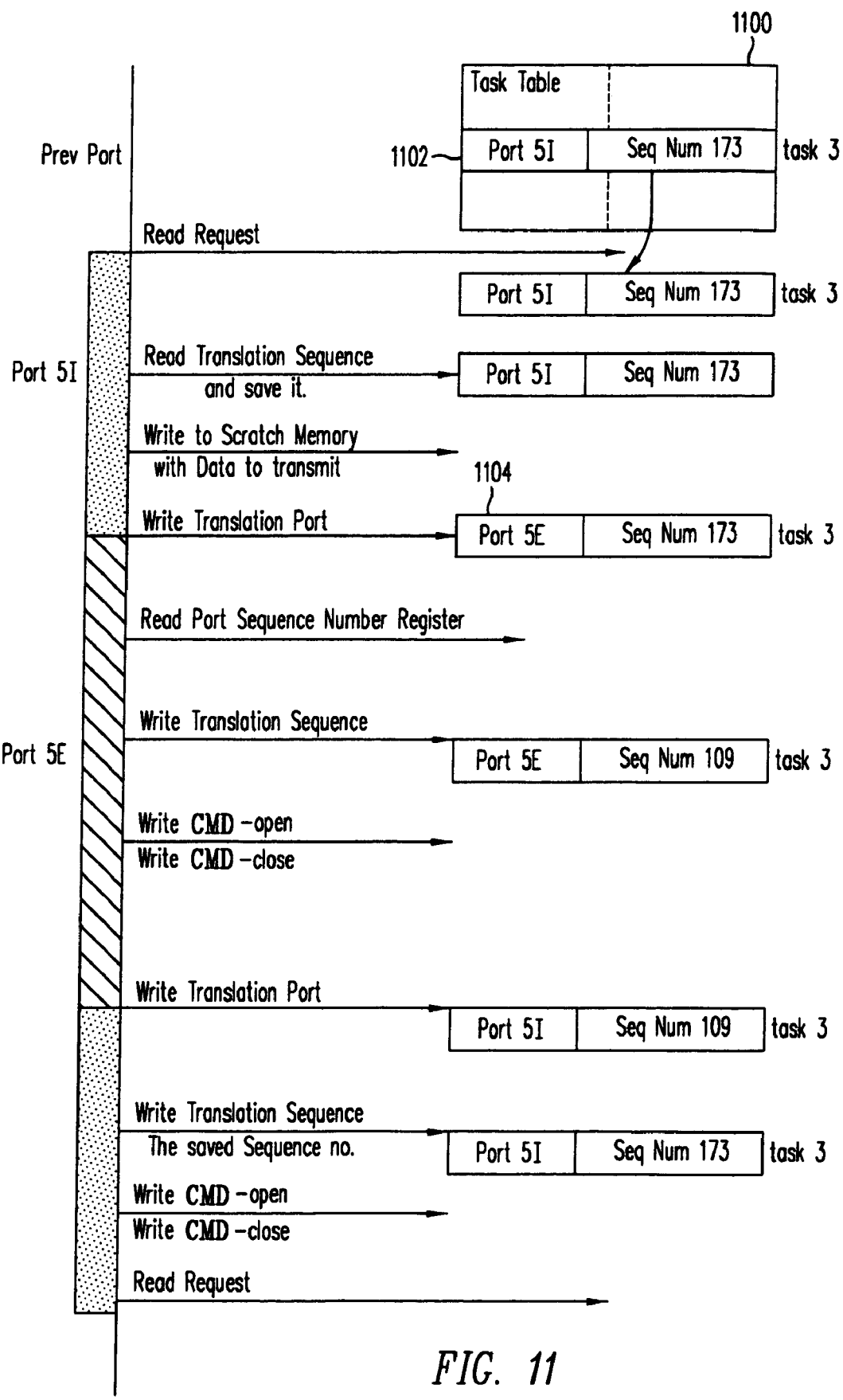
FIG. 11 illustrates, in a block diagram a control packet being sent back on egress of a port in accordance with some embodiments of the invention.

FIG. 11 illustrates, in a block diagram a control packet being sent back on egress of a port in accordance with some embodiments of the invention. For example, the translation table 1100 has an entry for Port 5 Ingress 1102. After some processing (e.g., read and write processing), the task updates the translation table to indicate that it will be working with resources of Port 5 Egress 1104.

To summarize, in some embodiments of the invention, dynamic task allocation is provided to handle the processing of packets in a multi lanes and tasks environment. Each packet is marked by its identification (lane number, packet sequence number). Then all packets, with their identifications are queued in common request FIFOs. Any task that terminates some packet processing gets a new assignment, from the common request FIFO. At this stage, the task gets the identification of the packet (lane number, packet sequence number) and any access to any resource is qualified by this identification. Any qualified access to any database, are directed in the memory access logic to the database of the packet. When a task is being assigned a packet it will have access to all resources of the packet that are available, using redirection of accesses, according to the identification.

Although the invention has been described with reference to particular embodiments, the description is only an example of the invention's application and should not be taken as a limitation.

Additionally, some embodiments of the invention may be tangibly embodied as software in a computer-readable device or media, such as memory, data storage devices, and/or data communication devices, thereby making a product or article of manufacture according to the some embodiments of the invention. As such, the terms "article of manufacture" and "computer program product" and "computer-readable storage medium" as used herein are intended to encompass software accessible from any computer readable device or media. Using the present specification, some embodiments of the invention may be implemented as a machine, process, or article of manufacture by using programming and/or engineering techniques to produce software, firmware, hardware, or any combination thereof.

Various other adaptations and combinations of features of embodiments disclosed are within the scope of the invention as defined by the following claims.

We claim:

1. A method for processing a packet, comprising:
   assigning a packet to a lane;
   dynamically allocating a task to process the packet; and
   while processing the packet, allowing the task to access one or more resources associated with the packet and with the lane of the packet;
   when the task attempts to access a resource, obtaining the lane and a packet sequence number from a translation table using a task number of the task.

2. The method of claim 1, wherein the task is assigned to an available packet when the task becomes available.

3. A computer readable storage medium encoded with software instructions to perform the process of claim 2 when executed by a computer.

4. A system for performing the method of claim 2.

5. A system for performing the method of claim 1.

6. A computer readable storage medium encoded with software instructions to perform the process of claim 1 when executed by a computer.

7. A method for processing a packet, comprising:
   assigning a packet to a lane;
   dynamically allocating a task to process the packet; and
   while processing the packet, allowing the task to access one or more resources associated with the packet and with the lane of the packet;
   wherein the resource comprises a memory and further comprising:
   when it is determined that access is to be provided to the task, using the lane and a packet sequence number to identify a portion of the memory that the task may access.

8. The method of claim 7 wherein for each lane, at least two different packet sequence numbers correspond to different memory portions.

9. The method of claim 7 wherein each memory portion is a command FIFO for storing one or more commands to process packets, the commands being written to the command FIFOs by the tasks.

10. A system for performing the method of claim 7.

11. A computer readable storage medium encoded with software instructions to perform the process of claim 7 when executed by a computer.

12. A method for processing a packet, comprising:
assigning a packet to a lane;
dynamically allocating a task to process the packet; and
while processing the packet, allowing the task to access one or more resources associated with the packet and with the lane of the packet;
wherein the task requests assignment to a second packet when the task has completed processing a first packet.

13. A system for performing the method of claim 12.

14. A computer readable storage medium encoded with software instructions to perform the process of claim 12 when executed by a computer.

15. A method of inserting a packet, comprising:
reading a packet sequence number from a sequence number counter; and
writing commands using the read packet sequence number;
updating a lane number in a translation table.

16. A method for executing a task by a processor to process a packet associated with a first lane, wherein when the task is associated with a lane, the task is allowed to access at least one resource associated with the lane associated with the task but is not allowed to access at least one other resource associated with a lane not associated with the task, wherein an association between the task and a lane is specified in a memory data structure used to determine the lane associated with the task when determining whether or not the task is allowed to access a resource, the method comprising:
(1) associating the task with the first lane in said memory data structure, and processing the packet by the task;
(2) after the operation (1), before finishing the processing of the packet by the task, associating the task with a second lane in said memory data structure, and the task accessing a resource which is associated with the second lane and which was inaccessible to the task when the task was not associated with the second lane;
(3) after the operation (2), re-associating the task with the first lane in said memory data structure, and continuing processing the packet by the task.

17. The method of claim 16, wherein:
the operation (1) comprises assigning a first packet sequence number to the packet, and associating the task with the first packet sequence number in said memory data structure, wherein said memory data structure is used to determine the packet sequence number associated with the task, wherein when the task is associated with a lane and a packet sequence number, the task is allowed or not allowed to access a resource associated with the lane depending on the packet sequence number;
wherein the operation (2) comprises associating the task with a second packet sequence number in said memory data structure.

18. A computer readable storage medium encoded with software instructions to perform the process of claim 17 when executed by a computer.

19. The method of claim 17 wherein the operation (3) comprises re-associating the task with the first sequence number in said memory data structure to continue processing the packet by the task.

20. A system for performing the method of claim 19.

21. A computer readable storage medium encoded with software instructions to perform the process of claim 19 when executed by a computer.

22. A system for performing the method of claim 17.

23. A system for performing the method of claim 16.

24. A computer readable storage medium encoded with software instructions to perform the process of claim 16 when executed by a computer.

25. The method of claim 16 wherein the operation (2) comprises the task inserting data into a data flow associated with the second lane.

26. A system for performing the method of claim 25.

27. A computer readable storage medium encoded with software instructions to perform the process of claim 25 when executed by a computer.

28. A system, comprising:
a resource;
a translation table; and
means for translating a task number to a lane and a packet sequence number using the translation table to determine whether a task may access the resource.

29. The system of claim 28, comprising:
an input control; and
a sequence number counter in the input control.

30. The system of claim 29, further comprising:
means for assigning a packet sequence number to a packet using the sequence number counter.

31. The system of claim 28, comprising:
a request queue storing requests to process a packet.

32. The system of claim 31, comprising:
means for assigning a task to process a request in the request queue.

33. The system of claim 32, further comprising:
means for assigning the task based on a number of active tasks on a virtual micro controller executing the task.

34. The system of claim 32, further comprising:
means for assigning the task based on a number of active tasks on a physical micro controller executing the task.

35. The system of claim 31, further comprising:
means for a task to request assignment to process a request.

* * * * *